United States Patent [19]

Yano et al.

[11] Patent Number: 5,171,788

[45] Date of Patent: Dec. 15, 1992

[54] INTERNAL-FINISHING SKIN MATERIAL

[75] Inventors: Noriyoshi Yano, Zushi; Tetsuo Kijima; Shohei Tsunoda, both of Tokyo; Toshihiko Tanaka, Yokkaichi, all of Japan

[73] Assignee: Nippon Polyurethane Industry Co., Ltd., Tokyo, Japan

[21] Appl. No.: 595,183

[22] Filed: Oct. 10, 1990

[51] Int. Cl.$^5$ .................... C08L 27/06; C08L 75/06
[52] U.S. Cl. ................... 525/131; 525/129; 428/904
[58] Field of Search ................ 525/129, 131; 428/904

[56] References Cited

U.S. PATENT DOCUMENTS

| | | | |
|---|---|---|---|
| 3,715,326 | 2/1973 | Traubel et al. | 521/64 |
| 4,870,142 | 9/1989 | Czerwinski et al. | 525/528 |

FOREIGN PATENT DOCUMENTS

| | | |
|---|---|---|
| 60-262843 | 12/1985 | Japan . |
| 61-242228 | 6/1986 | Japan . |
| 61-152878 | 7/1986 | Japan . |
| 62-41247 | 2/1987 | Japan . |
| 62-64861 | 3/1987 | Japan . |

Primary Examiner—James J. Seidleck
Assistant Examiner—Thomas Hamilton, III
Attorney, Agent, or Firm—Davis, Hoxie, Faithfull & Hapgood

[57] ABSTRACT

A material for the preparation of an internal-finishing skin of a composite type composed of a polyvinyl chloride and a polyurethane derived from reaction of a polyester polyol with an aliphatic or alicyclic diisocyanate, in which said polyesterpolyol comprising:

(a) in the molecule, a group of $$-O-C-(CH_2)_n-C-O-,$$
$$\quad\; \| \qquad\qquad\quad \|$$
$$\quad\; O \qquad\qquad\quad O$$

and groups of [I], [II], and [III] which link to the abovementioned formula:

$-(CH_2)_m-$      [I]

$$-CH_2CH_2\overset{\overset{\displaystyle CH_3}{|}}{C}HCH_2CH_2- \quad [II]$$

$$-CH_2\overset{\overset{\displaystyle R}{|}}{\underset{\underset{\displaystyle R'}{|}}{C}}CH_2- \quad [III]$$

where n and m are respectively an integer of from 4 to 9 which may be identical to or different from each other, R and R' are respectively a lower alkyl which may be identical to or different from each other; [II] being contained in an amount of 30 to 50 mol %, [III] being contained in an amount of 10 to 25 mol %, and [I] being the remainder (25 to 60 mol %) based on the total amount of [I], [II], and [III]; and has (b) OH groups at ends of the molecule, and (c) a number-average molecular weight of from 1,000 to 10,000.

17 Claims, No Drawings

INTERNAL-FINISHING SKIN MATERIAL

BACKGROUND OF THE INVENTION

1. Field of the Invention

The present invention relates to a material for the preparation of internal-finishing skin of a composite resin type, which comprises a polyurethane type resin (hereinafter referred to as "PU") having a specified chemical structure and a specified composition, and a polyvinyl chloride type resin (hereinafter referred to as "PVC"). More particularly, the present invention relates to a material for the preparation of an interior-finishing skin superior in flexibility, anti-fogging properties, adhesiveness to a cushioning material, non-surface tackiness, heat resistance, impact strength at low temperature, and having satisfactory embossing property for surface decorative design.

2. Related Background Art

In recent years, requirements for the performance of internal-finishing skin are becoming increasingly higher and severer. The internal-finishing skin is required to be satisfactory in both of touch feeling and design decorativeness in addition to the properties as an internal-finishing skin.

Particularly in the skin for automotive internal-finishing, performance requirements have become much severer: namely requirements for flexibility to give soft touch feeling, and simultaneously, with regard to durability, long-term retention of properties at high temperature and impact resistance at low temperature are required. Further, anti-fogging properties are important from the standpoint of safety.

On the other hand, the requirement for workability of the materials for the preparation of internal-finishing skin is becoming severer for higher production efficiency: the embossing should be satisfactory in skin material molding, and surface pattern should be retained without loss of emboss at release of mold even at a high temperature. The surface emboss pattern has become greatly complicated in these days for higher decorativeness of design, for which a finely designed and deeply embossing mold has to be employed, so that the aforementioned requirements for workability are becoming severer.

Under such circumstances, non-rigid PVC resins plasticized with a plasticizer are mainly used conventionally for automotive internal-finishing skin. Such a non-rigid PVC, which contains a low molecular plasticizer, has a disadvantage of impairing driver's visual range owing to oil film formation (fogging) on a windshield or the like caused by migration of the plasticizer. Additionally, the non-rigid PVC has disadvantages, caused by migration of a plasticizer, of disappearance of embossing, hardening to become brittle, and occurrence of cracking by impact at a low-temperature.

Increase of softness to meet the requirement for soft feeling needs an increased amount of the plasticizer, which results in more serious disadvantages mentioned above, and low mechanical properties to cause loss of emboss on hot molding.

Hitherto, the purpose of offsetting the above disadvantages, it is known that polymer alloys are produced by blending or copolymerizing PU and PVC for preparing non-rigid PVC.

For a material for the preparation of automotive internal-finishing skin, however, the conventional PU-PVC composite resins have not been brought into practical use because of incompatibility of flexibility for soft touch feeling and mechanical properties of the product, and moldability for embossing and mold releasability during processing the material for internal-finishing skin, especially in large-sized molded articles such as skins for an instrument panel.

Japanese patent laid-open application Sho 62-64861 discloses a composite resin composition composed of PU and PVC, in which the PU is prepared by reaction of an organic polyisocyanate with a polyesterpolyol derived from 3-methyl-1,5-pentanediol solely or a mixed diol containing it at a content of 10 mole % or more with a dicarboxylic acid. The PU-PVC composite resin composition thus prepared is known to be satisfactory in compatibility of PU with PVC, to exhibit sufficient plasticizing property, and to prepare a composition for soft articles with easy.

Practicably, however, if the content of 3-methyl-1,5-pentanediol in the mixed diol is 30 mol % or less, the PU derived from the mixed diol cannot exhibit satisfactory plasticizing property. If the content exceeds 30 mol %, the PU-PVC composite resin composition has tackiness and is liable to cause inconveniences during processing such as loss of emboss in molding and the like. Accordingly, in the mixed diol, a linear diol having relatively many methylene groups such as 1,9-nonanediol and the like is incorporated as one component. In this case, however, disadvantages arise that the plasticizing effect is not sufficiently exhibited and processing temperature at the hot molding becomes high to reduce the moldability. Accordingly, this PU-PVC composite resin composition, in use for internal-finishing sheets, is disadvantageous in difficulty of the preparation of embossing and of article having fine decorative design.

As described above, improvement in soft touch feeling or flexibility of a thermoplastic resin will impair tensile strength, heat distortion resistance and other properties thereof, and will increase surface tackiness properties of the sheets. It is difficult that known resins can be formed into a sheet having a sufficiently decorative design of skin of a leather-like pattern without loss of emboss during heat molding or without sticking to a mold.

SUMMARY OF THE INVENTION

It is an object of the present invention to provide a material for the preparation of internal-finishing skin having superior soft touch feeling and excellent decorative design from a PU-PVC composite resin by improvement in compatibility of flexibility and surface non-tackiness of the skin with excellent embossing property of the PU-PVC composite resin without loss of emboss during hot molding such as extrusion molding, injection molding, compression molding, vacuum molding, blow molding, slush molding, and the like without impairing anti-fogging property, adhesiveness, heat-resistance, and impact strength at low temperature which are inherently superior properties of the PU-PVC composite resin. Such compatibility of the properties has not been achievable in prior art.

The present invention provides a material for the preparation of internal finishing skin of a composite resin type composed of a polyvinyl chloride and a polyurethane derived from reaction of a polyester polyol with an aliphatic or alicyclic diisocyanate, in which the polyesterpolyol comprises:

(a) in the molecule, a group of

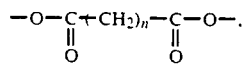

and groups of [I], [II], and [III] which link to the abovementioned formula:

$$-(CH_2)_m-  \quad [I]$$

$$-CH_2CH_2CHCH_2CH_2- \quad [II]$$
$$\phantom{-CH_2CH_2C}|\phantom{H_2CH_2-}$$
$$\phantom{-CH_2CH_2CH}CH_3$$

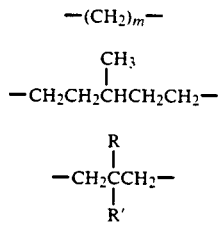

where n and m are respectively an integer of from 4 to 9 which may be identical to or different from each other, R and R' are respectively a lower alkyl which may be identical to or different from each other; [II] being contained in an amount of 30 to 50 mol %, [III] being contained in an amount of 10 to 25 mol %, and [I] being the remainder (25 to 60 mol %) based on the total amount of [I], [II], and [III]; and has (b) OH groups at ends of the molecule, and (c) a number-average molecular weight of from 1,000 to 10,000.

According to one aspect of the present invention, there is provided the composite resin, in which the aliphatic diisocyanate may be hexamethylene diisocyanate.

According to another aspect of the present invention, there is provided the composite resin, in which the groups R and R' may be identical to or different from each other and may be a methyl group or an ethyl group.

DETAILED DESCRIPTION OF THE PREFERRED EMBODIMENT

The polyesterpolyol employed in the present invention comprises a group of $-O-C(=O)-(CH_2)_n-C(=O)-O-$ (where n has the same meaning as mentioned above, hereafter being the same), and the three groups [I], [II], and [III] which link to the abovementioned formula. In the absence of the group [III], only with groups [I] and [II], the object of the present invention is not achievable, but the disadvantages of the material become significant. Therefore the group [III] is really essential for exhibiting the characteristics of the respective groups and making compatible the above inconsistent properties.

In the molecules of the polyesterpolyol, the group $-O-C(=O)-(CH_2)_n-C(=O)-O-$ may be formed by use of, for example, adipic acid, pimelic acid, suberic acid, azelaic acid, or sebacic acid.

The group [I]: $-(CH_2)_m-$ (where m means the same as above) may be formed by use of, for example, 1,4-butanediol, 1,5-pentanediol, 1,6-hexanediol, or 1,9-nonanediol.

The group [II]: $-CH_2CH_2CH(CH_3)CH_2CH_2-$ may be formed from 3-methyl-1,5-pentanediol.

The group [III]: $-CH_2C(R)(R')CH_2-$ (where R and R' respectively mean the same as above) may be formed by use of, for example, neopentylglycol:

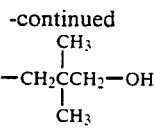

2,2-diethyl-1,3-propanediol:

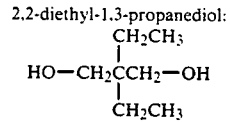

2-isobutyl-2-methyl-1,3-propanediol:

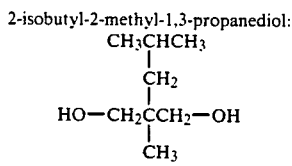

2-n-butyl-2-ethyl-1,3-propanediol:

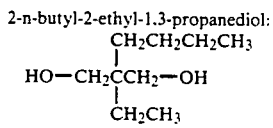

The polyesterpolyol employed in the present invention is a dicarboxylic acid type polyester having OH groups at the ends of the molecule, derived from condensation polymerization of the aforementioned carboxylic acid with the polyols in desired amounts.

On the basis of the total amount of the groups I], [II], and [III], the group [II] is contained in a ratio of 30 to 50 mol %, the group [III] is contained in a ratio of 10 to 25 mol %, and the group [I] accounts for the remainder, namely 25 to 60 mol %.

With the ratio of the group [I] of below 25 mol %, loss of emboss occurs and surface tackiness is remarkable during process, and additionally, the impact strength of the articles is extremely low.

With the ratio of the group [I] of above 60 mol %, the compatibility of the PU derived from the resulting polyesterpolyol is low, which retards the plasticization of the composite resin and makes embossing poor at the molding process, not giving high quality of internal-finishing skin.

With the ratio of the group [II] of below 30 mol %, the plasticizing effect of the PU derived from the polyesterpolyol toward the PVC is low, which retards the softening of the composite resin and requires high molding temperature for embossing the composite resin for an internal-finishing skin.

With the ratio of the group [II] of above 50 mol %, the surface tackiness of the skin obtained from the composite resin is remarkable, which is not suitable for surface skin materials and retards the production of a desired skin satisfying the designing because of occurrence of loss of emboss during processing, and lowering the productivity even though mold release is feasible if the mold is cooled sufficiently at the mold releasing step.

With the ratio of the group [III] of below 10 mol %, the surface tackiness of the skin obtained from the composite resin is not improved and the embossing is poor in the molding step.

With the ratio of the group [III] of above 25 mol %, the flexibility of the composite resin is not readily exhibited, and in particular, the impact strength of the composite resin at low temperature is extremely low.

The number-average molecular weight of the polyester polyol in the present invention should be within the range of from 1,000 to 10,000, preferably from 2,000 to 8,000 from the standpoint of the compatibility of the resulting PU and the PVC.

The aliphatic diisocyanate employed in the present invention includes hexamethylene diisocyanate, 2,4,4-trimethylhexamethylene diisocyanate, and 2,2,4-trimethylhexamethylene diisocyanate, and the like, and the alicyclic diisocyanate includes 4,4'-dicyclohexylmethane diisocyanate, isophorone diisocyanate, and the like. Diisocyanates generally employed in the PU formation include, in addition to the aforementioned aliphatic or alicyclic diisocyanates, aromatic diisocyanates such as 4,4'-diphenylmethane diisocyanate, tolylene diisocyanate, and the like. However, the PU which is derived from an aromatic diisocyanate does not give sufficient flexibility and involves disadvantages in weatherability.

The PVC resins applicable in the present invention are polymers containing vinyl chloride units including polyvinyl chloride homopolymers, and copolymers mainly constituted of vinyl chloride units such as vinyl chloride/vinyl acetate copolymers, vinyl chloride/ethylene/vinyl acetate copolymers, and the like having a polymerization degree of not less than 600. The PVC may contain, if necessary, preliminarily a stabilizer, a lubricating agent, a coloring material, and the like.

Further, in the present invention, a polymer-blended polyvinyl chloride may also be used, which is prepared by preliminarily blending PVC with a PVC-compatible thermoplastic resins or rubbers other than the PU, such as acrylic resins, styrene resins, ABS resins, nitrile rubbers, and the like.

In the present invention, the ratio (by weight) of the PVC component to the PU component is preferably in the range of from 30/100 to 100/30.

A specific embodiment of the PU-PVC composite resin according to the present invention is the one composed of PU and PVC, of which the PU is derived by reaction of hexamethylene diisocyanate with a polyesterpolyol having a number-average molecular weight of 2,000, the polyesterpolyol being prepared from 1,6-hexanediol, 3-methyl-1,5-pentanediol, and neopentyl glycol (molar ratio of 40/40/20) with adipic acid.

The composite resin according to the present invention composed of PU and PVC is produced by a method such as mentioned below:

(1) Polymer blending of PVC and a thermoplastic PU,
(2) Graft-polymerization of vinyl chloride on a thermoplastic PU: grafting by suspension polymerization of monomeric vinyl chloride with a PU soluble in vinyl chloride monomer as described in Japanese patent laid-open publications Sho. 58-40312, Sho. 58-42611, Sho. 58-37019, etc.,
(3) Production of a PU type composition in the presence of PVC powder as described in Japanese patent laid-open publication Sho. 58-5357,
(4) PU formation in PVC: impregnating the starting materials for PU successively into PVC under stirring, and forming PU in the PVC as described in Japanese patent laid-open applications Sho. 58-5357 and Sho. 61-250044,
(5) Production from mixed emulsion of a PVC emulsion and a PU emulsion,
(6) Reaction of a polyol-containing PVC with an isocyanate compound: reacting an isocyanate compound with a polyol-containing PVC prepared by the graft polymerization of vinyl chloride monomer on a polyol which is soluble in vinyl chloride monomer as shown in Japanese patent laid-open applications Sho. 61-120812, and Sho. 61-120820, and
(7) Blending by dissolution of PVC and PU in an organic solvent.

The material for the preparation of the internal-finishing skin according to the present invention is superior in heat resistance, impact resistance at low temperature, anti-fogging property, adhesiveness to a core material or a cushioning material. The material for the preparation of the internal-finishing skin prepares a surface of articles, which is soft and not sticky, and satisfactory in embossing and loses no emboss upon embossing process such as extrusion molding, injection molding, compression molding, vacuum molding, blow molding, slush molding, and the like. Therefore, the present invention for the first time provides a material for the production of internal-finishing skin satisfactory not only in performance (properties) but also in touch feeling and high decorative design of the skin. In other words, the present invention distinguishes in compatibility of the hitherto inconsistent properties i.e., flexibility, non-tackiness, and good embossing property. Accordingly, the skin prepared from the composite resin according to the present invention may be employed favorably in a variety of internal-finishing. In particular, the excellent performances of the skin are exhibited in automotive interior-finishing.

The present invention is described more specifically referring to Examples. In the Examples, the term "parts" is based on weight.

REFERENCE EXAMPLE 1

2,360 g (20 mols) of 1,6-hexanediol, 2,360 g (20 mols) of 3-methyl-1,5-pentanediol, 1,060 g (10 mols) of neopentylglycol, and 6,512 g (44.6 mols) of adipic acid were placed in a 15-liter reactor equipped with a partial condenser. Further, thereto, 0.2 g of tetrabutyl titanate was added, and a dehydration reaction was allowed to proceed at 200° C. for 12 hours at atmospheric pressure, and further the dehydration reaction was continued under reduced pressure for 12 hours at 200° C., thereby 10,680 g of a polyesterpolyol being produced. The resulting polyesterpolyol had an acid value of 0.2, a hydroxyl value of 55.9 and a number average molecular weight of 2,000.

The polyesterpolyol thus prepared has a constitution in a ratio (molar ratio of the groups) as shown in Table 1.

TABLE 1

| Group and Chemical structure | Mols (ratio) |
| --- | --- |
| $-OCCH_2CH_2CH_2CH_2CO-$<br>$\quad \parallel \qquad\qquad\qquad \parallel$<br>$\quad O \qquad\qquad\qquad\quad O$ | 44.6 |
| Group [I]<br>$-CH_2CH_2CH_2CH_2CH_2CH_2-$ | 20 (40) |
| Group [II]<br>$\qquad\quad CH_3$<br>$\qquad\quad \mid$<br>$-CH_2CH_2CHCH_2CH-$ | 20 (40) |

TABLE 1-continued

| Group and Chemical structure | Mols (ratio) |
| --- | --- |
| Group [III]<br>$\quad\quad CH_3$<br>$\quad\quad\mid$<br>$-CH_2CCH_2-$<br>$\quad\quad\mid$<br>$\quad\quad CH_3$ | 10<br>(20) |

REFERENCE EXAMPLES 2-5

Polyesterpolyols were prepared in the same manner as in Reference example 1 except that the diols and the dicarboxylic acid were changed to those shown in Table 2.

The starting materials, the molar ratios of the groups [I], [II], and [III], and the number-average molecular weight of the resulting polyesterpolyols are summarized in Table 2.

COMPARATIVE REFERENCE EXAMPLES 1-4

Polyesterpolyols were prepared in the same manner as in Reference example 1 except that two groups of diols were respectively used out of the three groups of [I], [II], and [III], and the dicarboxylic acid was changed.

The starting materials, the molar ratios of the two groups out of the groups [I], [II], and [III], and the number-average molecular weight of the resulting polyesterpolyols are summarized in Table 2.

EXAMPLE 1

16 parts of hexamethylene diisocyanate and 200 parts of the polyesterpolyol of Reference example 1 were mixed and stirred at a high speed. Thereafter, the mixture was extended in a vat and was kept at a temperature of 120° C. in a drier for 1 hour to complete the reaction to give a PU.

100 parts of the PU thus prepared was mixed with 100 parts of a powdery PVC having the degree of polymerization of 1,000 together with 0.5 part of calcium stearate, and 0.5 part of zinc stearate. The mixture was kneaded at 150° C. for 10 minutes, and made into a sheet of 0.8 mm thick.

The sheet thus prepared was overlayed on a nickel plate having a leather pattern engraved on the surface thereof and having been sprayed with a fluorine type releasing agent, which were pressed together at 180° C. at a pressure of 25 kg/cm² for 1 minute, and then cooled to 50° C. The sheet thus processed was removed from the nickel plate to prepare a sheet having leather pattern on the surface.

EXAMPLES 2-5

Sheets having a leather pattern on the surface were prepared in the same manner as in Example 1 except that the amount of hexamethylene diisocyanate, and the kind of polyesterdiol were changed as shown in Table 3.

COMPARATIVE EXAMPLES 1-4

Sheets having a leather pattern on the surface were prepared in the same manner as in Example 1 except that the kind of the polyesterdiol was changed respectively to those prepared in Reference comparative examples shown in Table 2.

METHOD OF MEASUREMENT]

Embossing Property

The average roughness of 10 points (Rz) and the maximum roughness (Rt) were measured with a surface roughness tester (Surfcorder SE-30H, made by Kosaka Kenkyusho) according to JIS B0601, and JIS B0651. The depth of the emboss was evaluated by the values of Rz and Rt.

Conditions for Measurement:
Length of measurement: 10 mm
Rate of delivery: 0.5 mm/s The results of the measurement were shown in a unit of $\mu$m in Table 3.

Surface Tackiness

The sheets prepared in Examples 1-5 and Comparative examples 1-4 were cut into a size of 5 cm×5 cm. The embossed surfaces were defatted with acetone. The two sheets were superposed with the embossed surface inside, and were pressed evenly with a weight of 500 g in a thermostat kept at 45° C. for 24 hours. The releasability was evaluated. The results are shown in two evaluation grades in Table 3.

O Not adhered
X Not readily releasable

Hardness

Hardness was measured according to JIS K6301.

Tensile Properties (Tensile Strength, and Elongation)

These were measured according to JIS K6723.

Impact Strength at Low Temperature

The brittle temperature was measured according to JIS K6723.

TABLE 2

|  |  | Reference examples | | | | | Comparative reference examples | | | |
| --- | --- | --- | --- | --- | --- | --- | --- | --- | --- | --- |
|  |  | 1 | 2 | 3 | 4 | 5 | 1 | 2 | 3 | 4 |
| Starting materials | Group [I] | | | | | | | | | |
|  | 1,6-hexanediol | 40 | 40 | 50 |  | 50 | 50 |  | 50 |  |
|  | 1,9-nonanediol |  |  |  | 25 |  |  | 50 |  |  |
|  | Group [II] | | | | | | | | | |
|  | 3-methyl-1,5-pentanediol | 40 | 40 | 35 | 50 | 40 | 50 | 50 |  | 50 |
|  | Group [III] | | | | | | | | | |
|  | Neopentylglycol | 20 | 20 | 15 | 25 |  |  |  | 50 | 50 |
|  | 2,2-diethyl-1,3-propanediol |  |  |  |  | 10 |  |  |  |  |
|  | Adipic acid | 89.2 | 96 | 90 | 90 | 45 | 89 | 88 | 89.5 | 89.5 |
|  | Azelaic acid |  |  |  |  | 45 |  |  |  |  |
| Molar ratio of [I]/[II]/[III] |  | 40/40/20 | 40/40/20 | 50/35/15 | 25/50/25 | 50/40/10 | 50/50/0 | 50/50/0 | 50/0/50 | 0/50/50 |
| Number-average molecular |  | 2,000 | 5,000 | 2,200 | 2,300 | 2,400 | 2,000 | 2,000 | 2,000 | 3,000 |

TABLE 2-continued

|  | Reference examples | | | | | Comparative reference examples | | | |
|---|---|---|---|---|---|---|---|---|---|
|  | 1 | 2 | 3 | 4 | 5 | 1 | 2 | 3 | 4 |
| weight of product | | | | | | | | | |

TABLE 3

|  | Examples | | | | | Comparative examples | | | |
|---|---|---|---|---|---|---|---|---|---|
|  | 1 | 2 | 3 | 4 | 5 | 1 | 2 | 3 | 4 |
|  | | | Reference example | | | | Comparative reference example | | |
| Kind of polyesterdiol | 1 | 2 | 3 | 4 | 5 | 1 | 2 | 3 | 4 |
| Molar ratio of [I]/[II]/[III] | 40/40/20 | 40/40/20 | 50/35/15 | 25/50/25 | 50/40/10 | 50/50/0 | 50/50/0 | 50/0/50 | 0/50/50 |
| Amount of hexamethylene diisocyanate (parts) | 16 | 6.5 | 14.5 | 14 | 13 | 16 | 16 | 16 | 16 |
| Embossing property: | | | | | | | | | |
| (a) Average roughness of 10 points (Rz) (μm) | 123 | 121 | 122 | 129 | 125 | 109 | 106 | 101 | 110 |
| (b) Maximum roughness (Rt) (μm) | 175 | 171 | 172 | 177 | 175 | 151 | 147 | 139 | 159 |
| Surface stickiness | ○ | ○ | ○ | ○ | ○ | X | X | ○ | X |
| Hardness (JIS A) | 64 | 63 | 65 | 64 | 63 | 65 | 64 | 68 | 63 |
| Tensile properties: | | | | | | | | | |
| (a) Tensile strength (kg/cm$^2$) | 140 | 130 | 140 | 135 | 135 | 140 | 135 | 130 | 120 |
| (b) Elongation (%) | 420 | 470 | 430 | 450 | 430 | 430 | 420 | 480 | 460 |
| Impact strength at low temperature: Brittle temperature (°C.) | <−60 | <−60 | <−60 | <−60 | <−60 | <−60 | <−60 | −46 | −38 |

We claim:

1. A composite material for the preparation of an internal-finishing skin comprising a polyvinyl chloride and a polyurethane, wherein the polyurethane is derived from reaction of a polyester polyol with an aliphatic or alicyclic diisocyanate, the polyester polyol comprising:

(a) in the molecule, a group of

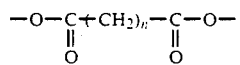

and groups I, II and III:

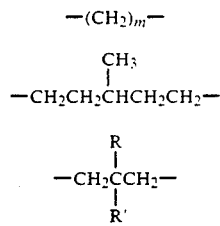

where n and m are respectively integers ranging from 4 to 9 which may be identical to or different from each other, R and R' are respectively a lower alkyl group which may be identical to or different from each other; II being present in amount of from 30 to 50 mol %, III being present in an amount of from 10 to 25 mol %, and I being the remainder (25 to 60 mol %) based on the total amount of I, II, and III; (b) OH groups at ends of the molecule, and (c) a number-average molecular weight of from 1,000 to 10,000.

2. The composite material of claim 1, wherein the aliphatic diisocyanate is hexamethylene diisocyanate.

3. The composite material of claim 1 wherein R and R' are selected from the group consisting of a methyl group and an ethyl group.

4. The composite material of claim 1 wherein the polyester polyol is derived from condensation polymerization of 1,6-hexanediol, 3-methyl-1,5-pentanediol, neopentylglycol, and adipic acid.

5. The composite material of claim 1 wherein the number-average molecular weight of the polyester polyol is in the range of from 2,000 to 8,000.

6. The composite material of claim 1 wherein the weight ratio of the polyvinyl chloride to the polyurethane is in the range of from 3/100 to 100/3.

7. The composite material of claim 4 wherein the diisocyanate is hexamethylene diisocyanate.

8. The composite material of claim 1 wherein the polyvinyl chloride is a copolymer comprising vinyl chloride and vinyl acetate monomeric units.

9. The composite material of claim 1 wherein the polyester polyol is derived from condensation polymerization of 1,9-nonanediol, 3-methyl-1,5-pentanediol, neopentylglycol, and adipic acid.

10. The composite material of claim 1 wherein the polyester polyol is derived from condensation polymerization of 1,6-hexanediol, 3-methyl-1,5-pentanediol, 2,2-diethyl-1,3-propanediol, adipic acid, and azelaic acid.

11. An internal-finishing skin comprising a polyvinyl chloride and a polyurethane, wherein the polyurethane is derived from reaction of a polyester polyol with an aliphatic or alicyclic diisocyanate, the polyester polyol comprising:

(a) in the molecule, a group of

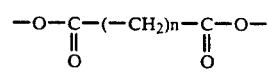

and groups I, II and III:

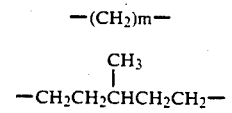

-continued $$-CH_2\overset{\overset{R}{|}}{\underset{\underset{R'}{|}}{C}}CH_2- \quad \text{III}$$

where n and m are respectively integers ranging from 4 to 9 which may be identical to or different from each other, R and R' are respectively a lower alkyl group which may be identical to or different from each other; II being present in amount of from 30 to 50 mol %, III being present in an amount of from 10 to 25 mol %, and I being the remainder (25 to 60 mol %) based on the total amount of I, II and III; (b) OH groups at ends of the molecule and (c) a number-average molecular weight of from 1,000 to 10,000.

12. The internal-finishing skin of claim 11 wherein the polyester polyol is derived from condensation polymerization of 1,6-hexanediol, 3-methyl-1,5-pentanediol, neopentylglycol, and adipic acid.

13. The internal-finishing skin of claim 11 wherein the polyester polyol is derived from condensation polymerization of 1,9-nonanediol, 3-methyl-1,5-pentanediol, neopentylglycol, and adipic acid.

14. The internal-finishing skin of claim 11 wherein the polyester polyol is derived from condensation polymerization of 1,6-hexanediol, 3-methyl-1,5-pentanediol, 2,2-diethyl-1,3-propanediol, adipic acid, and azelaic acid.

15. A method of preparing a composite material for the preparation of an internal-finishing skin comprising preparing a polyurethane from reaction of a polyester polyol with an aliphatic or alicyclic diisocyanate and combining the polyurethane with a polyvinyl chloride, the polyester polyol comprising:

(a) in the molecule, a group of $$-O-\underset{\underset{O}{\|}}{C}-(-CH_2)n-\underset{\underset{O}{\|}}{C}-O-$$

and groups I, II and III:

$$-(CH_2)m- \quad \text{I}$$

$$-CH_2CH_2\overset{\overset{CH_3}{|}}{C}HCH_2CH_2- \quad \text{II}$$

$$-CH_2\overset{\overset{R}{|}}{\underset{\underset{R'}{|}}{C}}CH_2- \quad \text{III}$$

where n and m are respectively integers ranging from 4 to 9 which may be identical to or different from each other, R and R' are respectively a lower alkyl group which may be identical to or different from each other; II being present in amount of from 30 to 50 mol %, III being present in an amount of from 10 to 25 mol %, and I being the remainder (25 to 60 mol %) based on the total amount of I, II and III; (b) OH groups at ends of the molecule, and (c) a number-average molecular weight of from 1,000 to 10,000.

16. The method of claim 15 wherein the polyester polyol is prepared by condensation polymerization.

17. The method of claim 15 wherein the diisocyanate is hexamethylene diisocyanate.

* * * * *

UNITED STATES PATENT AND TRADEMARK OFFICE
CERTIFICATE OF CORRECTION

PATENT NO. : 5,171,788
DATED : December 15, 1992
INVENTOR(S) : N. Yano, et al

It is certified that error appears in the above-indentified patent and that said Letters Patent is hereby corrected as shown below:

On the title page, insert under the filing date:
--[30] Foreign Application Priority Data
October 11, 1989 [JP] Japan........1-263093--

Column 6, lines 65-67, change "$-CH_2CH_2\overset{\overset{\displaystyle CH_3}{|}}{C}HCH_2CH-$" to ---$CH_2CH_2\overset{\overset{\displaystyle CH_3}{|}}{C}HCH_2CH_2$---

Signed and Sealed this

Twenty-sixth Day of October, 1993

Attest:

BRUCE LEHMAN

Attesting Officer

Commissioner of Patents and Trademarks